United States Patent Office 3,076,849
Patented Feb. 5, 1963

3,076,849
PROCESS FOR PREPARING ORTHO-SEC-ALKYL THIOPHENOLS USING BF₃ AS CATALYST
Martin B. Neuworth, Pittsburgh, Pa., and Eric B. Hotelling, Westport, Conn., assignors to Consolidation Coal Company, Pittsburgh, Pa., a corporation of Pennsylvania
No Drawing. Filed Nov. 21, 1960, Ser. No. 70,424
18 Claims. (Cl. 260—609)

This invention relates to alkylated thiophenols and processes for preparing them. More particularly, it relates to a process whereby ortho-alkyl thiophenols are prepared by direct nuclear alkylation of a thiophenol in the presence of boron trifluoride as catalyst.

The problems involved in the direct alkylation of thiophenols are well known. As has been pointed out in U.S. Patent 2,753,378:

"In contrast with phenolic compounds, which are simply alkylated to produce alkyl phenols, previous efforts to alkylate thiophenols have resulted in alkylation exclusively of the sulfur atom with the resulting production of aryl alkyl sulfides. Since efforts to effect carbon alkylation of thiophenols in the past have resulted in the production of aryl alkyl sulfides, it has been necessary to resort to means such as zinc dust reduction of alkyl benzene sulfonyl chlorides, the reaction of diazotized alkaryl amines with hydrogen sulfide, catalytic hydrogenation of aryl sulfonic acids and the action of sulfur on Grignard reagents in order to produce alkyl-substituted thiophenols. In addition to the tendency towards thioether formation, attemped alkylation of thiophenols has also been complicated by the fact that common alkylating catalysts such as anhydrous aluminum chloride and concentrated sulfuric acids have tended to cause desulfurization and condensed ring formation at relatively mild operating conditions."

It has been reported in the prior art that thiophenols, including ortho- and meta-substituted alkyl thiophenols, can be directly alkylated in the para position by using a combination of a specific alkylating agent, namely, either a tertiary aliphatic alcohol or a tertiary aliphatic mercaptan, together with a specific catalyst, namely, an aluminum halide catalyst, e.g., aluminum chloride. Primary and secondary alcohols are considered unsuitable as alkylating agents in that sulfur-alkylated products are reported to be produced exclusively.

Relatively little information is available in the chemical literature with respect to the preparation of ortho-substituted alkyl thiophenols. None of this information relates to the direct nuclear alkylation of thiophenols in the ortho position. Heretofore, to obtain o-alkyl thiophenols, other than o-thiocresol and possibly o-ethylthiophenl, relatively expensive and involved techniques were required, which made the processes of little or no commercial interest. In one such method, the corresponding o-alkyl aniline derivative is converted to the o-alkyl thiophenol by the relatively elaborate Leuckart synthesis. In another method, the o-alkyl benzene sulfonyl chloride is converted to the o-alkyl thiophenol by a standard acid-metal reduction. The preparation of the starting materials for these reactions is further frequently involved and expensive.

Accordingly, it is an object of the present invention to provide a method, free from the disadvantages of known methods, for directly alkylating a thiophenol in the ortho position of the ring.

It is an additional object to provide novel ortho-alkylated thiophenols.

It is still a further object to provide ortho-substituted alkylated thiophenols in high yield by utilizing the process of this invention in conjunction with thioether cleavage techniques.

This invention involves the discovery that o-alkyl thiophenols may be produced in substantial yield by direct nuclear alkylation of thiophenol and its homologs with a selected secondary alkyl-generating olefin in the presence of boron trifluoride under prescribed alkylating conditions. This invention provides the first means for producing ortho-substituted alkyl thiophenols by a direct nuclear alkylation process which is adaptable to commercial exploitation.

Under selected ring-alkylating conditions, tertiary alkyl-generating olefins, e.g., isobutylene, can be made to nuclearly alkylate a thiophenol. However, the t-alkyl group will substitute in the para position only. If this position is blocked, ortho substitution will not take place; only sulfides, i.e., thioethers, will be formed.

In accordance with this invention, an alkylatable thiophenol containing an ortho position that is "free," i.e., unsubstituted by other than a hydrogen atom is converted to an o-alkyl thiophenol in substantial yield by reacting it with a secondary alkyl-generating olefin under ring alkylating conditions in the presence of boron trifluoride so that there occurs substantial substitution by the secondary alkyl group in the ortho position. Further, in accordance with this invention, it is also possible to obtain nuclear dialkylation in the event that both ortho positions are unsubstituted.

In addition to ortho-substituted mono and dialkyl thiophenols, S-alkyl thiophenols are also obtained. These sulfides or thioethers may be quantitatively converted to the corresponding thiophenols using a sulfide-cleavage technique. The product distribution obtained by the alkylation is determined by the selection of the thiophenol, the olefin, and the specific reaction conditions. The use of low temperatures is particularly favored.

Suitable alkylating agents include non-branched olefins, e.g., propylene and cyclopentene. The propylation reaction generally gives highest yields, with higher olefins giving lower yields of ortho-substituted ring-alkylated products. In general, non-terminal linear olefins, e.g., 2-butene, give poorer results than their terminal isomers, e.g., 1-butene. It is noted that the by-product sulfides cannot be isomerized by further reaction in the presence of boron trifluoride. This isomerization technique is effectively used for converting tertiary S-alkyl thiophenols to corresponding para-t-alkylated thiophenols. However, the sulfides formed in the present process may be quantitatively converted to the corresponding starting thiophenol or o-alkyl thiophenol by using any of various thioether cleavage techniques, e.g., reaction in the presence of either sodium metal in liquid ammonia, alumina-silica, or solid phosphoric acid. Effectively, then, in accordance with this invention, total conversion of a thiophenol to a nuclearly substituted ortho-alkylated product may be obtained by combining the process of this invention of direct nuclear alkylation in the ortho position with subsequent sulfide cleavage. Specific sulfide cleavage processes are disclosed and claimed in the following copending applications: M. D. Kulik and M. B. Neuworth, S.N. 94,164; R. J. Laufer, S.N. 94,163; and R. J. Laufer and M. B.

Neuworth, S.N. 94,161; all filed March 8, 1961, and assigned to the assignee of the present application.

The terms "alkylation" or "alkylating" as used herein, unless otherwise indicated, are directed to the substitution of a secondary alkyl hydrocarbon radical for a hydrogen atom in one or more ortho positions of a thiophenolic compound. The term "C-alkylation" is specific to substitution in the ring, and "S-alkylation" refers to substitution of the hydrogen atom attached to the sulfur atom to form an alkyl aryl sulfide, i.e., a thioether.

The alkylatable thiophenolic compounds that are employed as starting materials in the process of this invention contain a hydrogen atom in at least one ortho position. Alkyl substituents may be present on the remaining ring positions. Problems of steric hindrance, which ordinarily occur when an attempt is made to substitute a group onto the ring in a position adjacent to another group already on the ring, are of relatively minor importance compared with similar problems which occur under conditions of para alkylation. Thus, propylation of m-thiocresol can yield significant amounts of both possible ortho monoisopropyl derivatives as well as of the 2,6-diisopropyl derivative, whereas t-butylation of m-thiocresol is not feasible using isobutylene.

Thiophenol homologs that may be advantageously employed in the process of this invention include, for example, o-thiocresol, m-thiocresol, p-thiocresol, m-ethylthiophenol, 2,3-, 2,4-, 2,5-, 3,4-, and 3,5-thioxylenols, 4-t-butylthiophenol, and 4-t-butyl-o-thiocresol. In general, thiophenol itself and thiophenol substituted only by lower alkyl radicals ($C_1$ to $C_5$) are preferred as alkylatable starting materials. These preferred alkylatable thiophenols are unsubstituted by other than hydrogen in either or both ortho positions on the ring.

In general, secondary alkyl-generating unsaturated aliphatic hydrocarbons having from 3 to 12 carbon atoms, e.g., various olefins and olefin polymers, are suitable and preferred for the practice of this invention. Particularly useful are $C_3$ to $C_5$ olefins. As the molecular weight of the olefin employed increases, yields of ortho-substituted ring-alkylated product decrease. Suitable alkylating agents that may be used for obtaining substitution in the ortho position of the ring include propylene, 1-butene, 2-butene, 1-pentene, and cyclopentene.

It is considered an essential feature of this invention that boron trifluoride be used as catalyst together with a secondary alkyl-generating olefin to effect the direct nuclear alkylation of the thiophenol in the ortho position. For obtaining ortho substitution of a secondary alkyl group into the ring of a thiophenol, so-called conventional alkylation catalysts are not substitutive for each other. Thus, catalysts which are effective in a Friedel-Crafts reaction with respect to ring-alkylating phenols, e.g., zinc chloride, antimony trichloride, sulfuric acid, phosphoric acid, and feric chloride, are essentially ineffective for the ring alkylation of thiophenols in either the ortho or para position.

For obtaining substantial ring alkylation, the boron trifluoride should be present in at least a saturating amount. This represents the amount of boron trifluoride, at a given pressure, that is in equilibrium between the liquid and vapor phases of the reactant materials present. An amount of 5 to 10 percent of boron trifluoride, based on the original weight of the thiophenol, is general preferred, although amounts of catalyst between 3 and 25 percent are considered suitable. It is further preferred, in order to conserve the supply of boron trifluoride catalyst used and in order to increase the rate of conversion of thiophenol to C-alkylate product, that the reaction be carried out in a closed system at above atmospheric pressure and at a temperature between $-50$ and $+50°$ C. The reaction is generally rapidly completed at lower temperatures once all the olefin has been added, so that increasing the temperature will not significantly increase the reaction rate. If the olefin addition is made only at elevated temperatures, above 50° C., then sulfide formation will predominate. Room temperature will generally be most convenient for use, although maximum conversion to ring-alkylated product will generally occur at temperatures below 0° C.

The process disclosed herein is particularly advantageous for commercial exploitation inasmuch as the alkylated thiophenol may be completely converted to the ortho-C-alkylate product with no S-alkylate product present. The S-alkylate product formed generally consists of the sec-alkyl aryl sulfide and also of the sec-alkyl o-sec-alkaryl sulfide. Where both ortho positions are initially free, other sulfides will also be formed. In general, the product distribution is markedly affected by temperature. In contrast to the isomerization of sulfide, which is effectively used in the para alkylation reaction, in the present process the by-product sulfides are cleaved to form their corresponding thiophenols. This cleavage may be accomplished by reaction of the sulfide with sodium in liquid ammonia or by heating over alumina-silica catalyst or over solid phosphoric acid, e.g., phosphorus pentoxide absorbed on an inert carrier such as kieselguhr, commercially available as UOP No. 2 catalyst.

Without being restricted by the reaction mechanism to be suggested, it is believed that the high ortho selectivity of the reaction, combined with the promoting effect of low reaction temperatures, suggests the involvement of the olefin and the thiophenol in an intermediate complex in the vicinity of the sulfur atom. The effect of low temperatures is apparently to increase the stability of the complex. In contrast to para alkylation, it is believed that little or no nuclear alkylation or migration of the sulfides occurs. Thus recycling of the sulfides in the presence of catalyst is ineffective for increasing the yield of the ortho-alkylated thiophenol because of the absence of isomerization phenomena. It is believed that once all the olefin has been absorbed by the system, the reaction is essentially complete. An increase in reaction time beyond this point should not therefore significantly affect the final product distribution.

Depending upon specific reaction conditions with respect to alkylatable thiophenol, alkylating agent, and temperature, a reaction time of as little as half an hour may be suitable. In general, reaction times between 2 and 3 hours are preferred. Under optimum conditions of temperature and of catalyst concentration, as well as optimum olefin to thiophenol ratio, the reaction is rapidly completed. An increase in the reaction time beyond three hours will then give but little increase in the yield of o-alkyl thiophenol. Apparently, the final product distribution is rapidly attained, even at low temperatures.

The alkylated thoiophenols, both C-alkylated and S-alkylated, find a variety of uses. They are particularly useful as substantially odorless rubber peptizers. Several of these compounds or their metallic salts are of interest as lubricating oil additives because of their antioxidant and detergent properties. As antioxidants, they serve to prevent resin formation in fuels; condensed to form thioacetals, they are particularly suited as additives for high pressure lubricating oils; they are also useful as additives for metal cleaners to protect the metal from atmospheric attack; they also protect drying oils, such as linseed oil, from darkening and oxidation; they have also been used to stabilize preparations of adrenalin and other hormones. Various of the S-alkylate compounds are seen as possessing useful insecticidal properties in addition to being useful as ready sources for the production of the corresponding thiophenols.

For purposes of illustration, without limiting its scope, the process of this invention will be particularly described with reference to the conversion of thiophenol to o-isopropyl thiophenol. The following reactions, shown schematically and not stoichiometrically, illustrate the manner in which conversion of thiophenol to o-isopropyl-thiophenol may be obtained under preferred reaction conditions.

Reaction 1.—Propylation of thiophenol

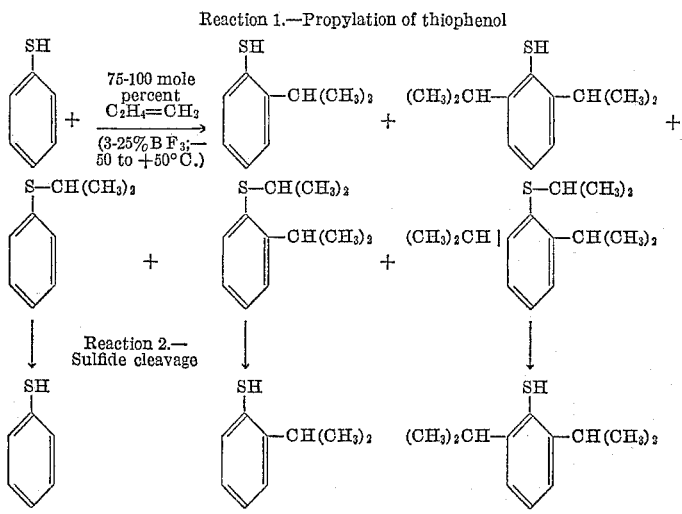

It is noted that in accordance with the above two reactions, the final product obtained is either a mono- or di-ortho alkylated product, or convertible thereto.

EXAMPLE 1

*Reaction of Thiophenol With Propylene*

Into a 300-ml. rocking bomb at room temperature was charged 165 grams (1.5 moles) of thiophenol, 60 grams (1.3 moles) of propylene, and 10 grams of boron trifluoride as catalyst (6 percent based on weight of thiophenol). There was a slight evolution of heat, with a pressure at 30° C. of 300 pounds per square inch gage. The reaction is considered essentially completed at this point. The bomb was further heated to 80° C. and maintained at this temperature for 5 hours under continuous rocking. It was then cooled overnight under pressure, and the reaction products were worked up in the usual manner, i.e., caustic extraction, neutralization, toluene addition, azeotropic distillation and Vigreux column distillation. Thiophenol and o-isopropylthiophenol were recovered from the caustic-soluble portion. An amount of 21 grams of o-isopropyl thiophenol (9.5% yield on propylene charged) boiling at 102° C. at 20 mm. was recovered. Thirty-five grams of isopropyl phenyl sulfide, B.P. 80° C. at 10 mm. (16% yield based on propylene charged) and higher boiling material were recovered from the caustic-insoluble portion. The identity of the o-isopropyl thiophenol was confirmed by infrared analysis and comparison with authentic samples prepared by alternate routes. Similarly confirmed by infrared analysis was the identity of the isopropyl phenyl sulfide.

The higher boiling caustic-insoluble material included about 2 percent of o-isopropyl isopropylphenyl sulfide, boiling at 114° C. at a pressure of 10 mm. of mercury. The foregoing Example 1 corresponds to Example 11 shown in our copending application, Serial No. 716,853, filed February 24, 1958, and since abandoned.

EXAMPLE 2

*Low-Temperature Reaction of Thiophenol With Propylene*

A two-liter, stainless steel, stirred autoclave was charged with 80 grams of 99+% thiophenol. The autoclave was purged with nitrogen and pressured to 240 p.s.i.g. with 85–90 grams of boron trifluoride. The reactor was cooled to −10° C. by circulating cold acetone through the internal coils. The propylene was contained in a heavy-walled stainless steel transfer bomb. The latter was heated externally to maintain the propylene vapor pressure above the pressure in the reactor by at least 10–20 p.s.i. The propylene was then charged as a liquid to the reactor. The flow was controlled to limit the temperature rise in the reactor and was halted when the propylene tank pressure approached that of the reactor.

The reactor was drained after 15 minutes, and the reaction mixture was washed with water and aqueous sodium bicarbonate to remove the catalyst. The products were separated by caustic extraction and each fraction was distilled. Analyses of the products were carried out by gas chromatography, and the peak assignments were checked by qualitative infrared spectra.

The specific reaction conditions and results obtained were as follows:

Propylene/thiophenol,
  mole ratio _____ 0.85.
Reaction temperature, ° C _____ Initial −10, final −15, range −15 to 0.
Reaction pressure, p.s.i.g _____ Initial 185, final 105.
Time of reaction _____ 1 hour.
Conversion of thiophenol,
  percent _____ 35.
Yields, percent:
  o-Isopropylthiophenol _____ 32.
  2,6-diisopropylthiophenol ___ 1.0.
  Isopropyl phenyl sulfide ____ 13.
  Isopropyl o-isopropylphenyl
    sulfide _____ 7.
  Isopropyl 2,6-diisopropyl-
    phenyl sulfide _____ 13.
  Residue and loss _____ 34.

EXAMPLE 3

*Reaction of Thiophenol With 1-Butene*

The same procedure used in Example 2 was followed, except that 1-butene was employed as alkylating agent. The specific reaction conditions and results obtained were as follows:

1-butene/thiophenol, mole ratio __ 0.9.
Reaction temperature, ° C. _____ Initial −10, final −5, range −17 to 5.
Reaction pressure, p.s.i.g. _____ Initial 175, final 75,
Time of reaction _____ 1 hour.
Conversion of thiophenol, percent _. 25.
Yields, percent:
  o-Sec-butylthiophenol _____ 13.
  p-Sec-butylthiophenol _____ 2.
  Sec-butylphenyl sulfide _____ 22.
  Sec-butyl o-sec-butylphenyl
    sulfide _____ 10.
  Sec-butyl 2,6-di-sec-butylphenyl
    sulfide _____ 4.
  Residue and loss _____ 49.

EXAMPLE 4

Cleavage of Sec-Alkyl Aryl Sulfide (Thioether Cleavage)

(a) *Reduction of isopropyl o-isopropylphenyl sulfide using sodium metal in anhydrous ammonia.*—Isopropyl o-isopropylphenyl sulfide (60.5 g.) was dissolved in 250 milliliters of ammonia maintained at its atmospheric reflux temperature, −33° C. Sodium metal was added in small pieces until an excess was present as determined by a blue coloration of the solution. The addition of sodium occurred over 1½ hours, with reaction of a half hour following the addition. After destruction of excess sodium and evaporation of ammonia, a residual solid was recovered and dissolved in 100 ml. of water. The aqueous solution was washed with ether, acidified and the product extracted with ether. From the ethereal solution was recovered 38.8 g. o-isopropylthiophenol.

(b) *Reduction of isopropyl 2,6-diisopropylphenyl sulfide using sodium metal in anhydrous ammonia.*—Isopropyl 2,6-diisopropylphenyl sulfide (48 g.) was reacted with sodium metal in anhydrous ammonia as described above. Thirty grams of 2,6-diisopropylthiophenol was finally recovered. This represented complete conversion of the starting sulfide and recovery and product of the yield of 75 percent.

(c) *Cleavage of isopropyl o-isopropylphenyl sulfide using solid phosphoric acid catalyst.*—Isopropyl o-isopropylphenyl sulfide (150 g.) was heated at a temperature between 295 and 325° C. in the presence of 20 g. solid phosphoric acid catalyst and a high boiling paraffin oil. The paraffin oil serves to increase the temperature at which the sulfide may be refluxed, at atmospheric pressure. After reaction for five hours under controlled reflux conditions in a packed column, followed by final removal of pot and column holdup under reduced pressure, a distillate was recovered. This distillate was refractionated to yield the following products:

|  | Weight (grams) | Yield, mole percent (based on 78.5% conversion of sulfide) |
|---|---|---|
| Thiophenol | 7.7 | 11.5 |
| Isopropylphenyl sulfide | 6.0 | 6.5 |
| o-Isopropylthiophenol | 63.1 | 67 |
| p-Isopropylthiophenol | 6.0 | 6.2 |

(d) *Cleavage of isopropyl 2,6-diisopropylphenyl sulfide using solid phosphoric acid as catalyst.*—Isopropyl 2,6-diisopropylphenyl sulfide (139 g.) was heated in the presence of 20 grams of solid phosphoric acid and 140 grams of high boiling paraffin oil essentially as described above. The following products were recovered:

|  | Weight (grams) | Yield, mole percent (based on 79% conversion of initial sulfide) |
|---|---|---|
| Thiophenol | 1.8 | 3.5 |
| Isopropylphenyl sulfide | 0.3 | 0.4 |
| o-Isopropylthiophenol | 9.5 | 13.4 |
| p-Isopropylthiophenol | 2.1 | 3.0 |
| Isopropyl isopropylphenyl sulfide | 6.6 | 7.3 |
| Diisopropylthiophenol [1] | 50.1 | 55.5 |

[1] Major isomer present was 2,6-diisopropylthiophenol.

Obviously many modifications and variations of the invention, as hereinbefore set forth, may be made without departing from the spirit and scope thereof, which are primarily directed to the direct alkylation of an alkylatable thiophenol in the ortho position in the presence of boron trifluoride as catalyst using a secondary alkyl-generating olefin as alkylating agent. The examples given, therefore, should be considered only illustrative of the invention, its scope being determined in accordance with the objects thereof and the appended claims.

We claim:

1. The process for preparing o-isopropyl thiophenols which comprises reacting a thiophenol containing a hydrogen atom in an ortho position with propylene in the presence of boron trifluoride as catalyst at ring alkylating conditions whereby substantial carbon propylation in an ortho position occurs.

2. The process for preparing alkyl thiophenols alkylated in an ortho position which comprises alkylating a thiophenol selected from the class consisting of thiophenol and lower alkyl-substituted thiophenols having an unsubstituted ortho position on the ring with a monoolefin containing from 3 to 12 carbon atoms, in which the alkyl substituent formed is a secondary alkyl group, at greater than atmospheric pressure at a temperature between −50 and +50° C., boron trifluoride being present in at least saturating amounts.

3. The process according to claim 2 wherein the boron trifluoride is present in an amount of between 3 and 25 percent by weight of the starting thiophenol.

4. A process of substituting the hydrogen atom in an ortho position of a thiophenol by a secondary alkyl group which comprises alkylating an alkylatable thiophenol containing a hydrogen atom in an ortho position with a monoolefinic hydrocarbon alkylating agent, in which the alkyl substituent formed is a secondary alkyl group, in the presence of boron trifluoride as catalyst at ring alkylating conditions so that there occurs substantial substitution by the secondary alkyl group in an ortho position in addition to S-alkylation.

5. The process for preparing an alkyl thiophenol substituted in an ortho position of the ring which comprises alkylating an alkylatable thiophenol containing a hydrogen atom in an ortho position with a monoolefinic hydrocarbon containing from 3 to 12 carbon atoms and in which the alkyl substituent formed is a secondary alkyl group, in the presence of boron trifluoride as catalyst at ring alkylating conditions so that there occurs substantial substitution by the secondary alkyl group in an ortho position.

6. The process for preparing alkyl thiophenols alkylated in an ortho position which comprises alkylating a thiophenol selected from the class consisting of thiophenol and lower alkyl-substituted thiophenols having an unsubstituted ortho position on the ring with a monoolefin containing from 3 to 12 carbon atoms and in which the alkyl substituent formed is a secondary alkyl group, in the presence of boron trifluoride as catalyst at ring alkylating conditions so that there occurs substantial substitution by the secondary alkyl group in an ortho position.

7. The process for preparing ortho-alkyl thiophenols of substantially all C-alkylate product which comprises reacting a thiophenol containing a hydrogen atom in an ortho position with a monoolefin containing from 3 to 12 carbon atoms and in which the alkyl substituent formed is a secondary alkyl group, at ring alkylating conditions in the presence of boron trifluoride so that the reaction mixture obtained includes substantial amounts of ortho-C-alkylate product in addition to S-alkylate products selected from the class consisting of sec-alkyl o-sec-alkaryl sulfide and sec-alkyl aryl sulfide, and cleaving the S-alkylate products in the presence of a sulfide-cleavage catalyst to form o-sec-alkyl thiophenol and the starting thiophenol as cleavage residues from respective S-alkylate products.

8. The process according to claim 7 wherein the regenerated starting thiophenol is recirculated in the system.

9. The process according to claim 7 wherein said monoolefin consists of propylene.

10. A 2,6-di-sec-alkylthiophenol, wherein each secondary alkyl group contains from 3 to 12 carbon atoms.

11. 2,6-diisopropylthiophenol.

12. 2,6-di-sec-butylthiophenol.

13. A sec-alkyl o-sec-alkaryl sulfide, wherein each secondary alkyl group contains from 3 to 12 carbon atoms.

14. Isopropyl o-isopropylphenyl sulfide.

15. Sec-butyl o-sec-butylphenyl sulfide.

16. A sec-alkyl 2,6-di-sec-alkaryl sulfide, wherein each secondary alkyl group contains from 3 to 12 carbon atoms.

17. Isopropyl 2,6-diisopropylphenyl sulfide.

18. Sec-butyl 2,6-di-sec-butylphenyl sulfide.

References Cited in the file of this patent

UNITED STATES PATENTS

| | | |
|---|---|---|
| 2,686,815 | Nickels | Aug. 17, 1954 |
| 2,739,172 | Peters | Mar. 20, 1956 |
| 2,800,451 | Mottern et al. | July 23, 1957 |
| 2,843,465 | Yust et al. | July 15, 1958 |

UNITED STATES PATENT OFFICE
CERTIFICATE OF CORRECTION

Patent No. 3,076,849            February 5, 1963

Martin B. Neuworth et al.

It is hereby certified that error appears in the above numbered patent requiring correction and that the said Letters Patent should read as corrected below.

Column 1, line 53, for "o-ethylthiophenl" read -- o-ethylthiophenol --; column 3, line 55, for "feric" read -- ferric --; column 4, line 51, for "thoiophenols" read -- thiophenols --; column 5, Reaction 1, under the arrow, for $(3-25\% \ BF_3; - 50 \text{ to } +50°\text{ C.})$     read     $(3-25\% \ BF_3; -50 \text{ to } +50°\text{ C.})$ same column 5, line 66, for "80" read -- 880 --.

Signed and sealed this 8th day of October 1963.

(SEAL)
Attest:

ERNEST W. SWIDER
Attesting Officer

EDWIN L. REYNOLDS
Acting Commissioner of Patents